(12) United States Patent
Kozlovsky et al.

(10) Patent No.: US 6,972,907 B2
(45) Date of Patent: Dec. 6, 2005

(54) TUNABLE LASER MODULES INCORPORATING MICROMACHINED PELLICLE SPLITTERS

(75) Inventors: William J. Kozlovsky, Sunnyvale, CA (US); Mark McDonald, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/980,057

(22) Filed: Nov. 3, 2004

(65) Prior Publication Data

US 2005/0088716 A1    Apr. 28, 2005

Related U.S. Application Data

(62) Division of application No. 10/454,071, filed on Jun. 4, 2003, now Pat. No. 6,859,330.

(51) Int. Cl.[7] .............................................. G02B 27/12
(52) U.S. Cl. ...................... 359/639; 359/629; 359/634
(58) Field of Search ................... 359/582, 583, 359/629, 634, 639, 847; 372/20, 23, 34, 36; 356/519; 385/31, 33, 36, 39

(56) References Cited

U.S. PATENT DOCUMENTS

| | | | |
|---|---|---|---|
| 4,574,263 A | 3/1986 | Liddiard | |
| 5,528,040 A * | 6/1996 | Lehmann | 250/343 |
| 6,144,025 A * | 11/2000 | Tei et al. | 250/226 |
| 6,192,059 B1 | 2/2001 | Karioja et al. | |
| 6,215,802 B1 | 4/2001 | Lunt | |
| 6,490,397 B2 | 12/2002 | Kato et al. | |
| 6,509,987 B1 | 1/2003 | Hunziker et al. | |
| 6,525,884 B2 * | 2/2003 | Kraiczek et al. | 359/629 |
| 6,544,693 B2 | 4/2003 | Levinson et al. | |

* cited by examiner

*Primary Examiner*—Hung Xuan Dang
*Assistant Examiner*—Joseph Martinez
(74) *Attorney, Agent, or Firm*—Marshall, Gerstein & Borun LLP

(57) ABSTRACT

A micromachined pellicle beam splitter and method of manufacture thereof are disclosed. In one embodiment, the beam splitter includes a silicon frame with a silicon nitride membrane attached to the frame and covering an opening through the frame. Other materials may be utilized, however, the coefficient of thermal expansion (CTE) of the membrane should be greater than that of the frame. The beam splitter may be manufactured by coating a silicon substrate with a layer of silicon nitride, patterning an opposite side of the silicon substrate with a photoresist or a metallic layer to define an opening an etching an opening through the substrate to the silicon nitride with either a dry etch or wet etch technique. An improved tunable laser module incorporating the micromachined pellicle beam splitter and a method of tuning a laser diode are also disclosed.

29 Claims, 5 Drawing Sheets

TUNABLE LASER MODULES INCORPORATING MICROMACHINED PELLICLE SPLITTERS

CROSS-REFERENCE TO RELATED APPLICATION

This is a divisional of application Ser. No. 10/454,071, filed on Jun. 4, 2003, now U.S. Pat. No. 6,859,330, which is incorporated herein by reference.

TECHNICAL FIELD

Micromachined pellicle optical beam splitters are disclosed. More specifically, pellicle beam splitters are disclosed which comprise a silicon frame and a silicon nitride membrane. Methods of manufacturing the disclosed beam splitters using wet and dry etch techniques are also disclosed. Tunable laser modules including a disclosed pellicle beam splitter are also disclosed.

BACKGROUND OF THE RELATED ART

Pellicle bean splitters are known. Currently available pellicle beam splitters are relatively large in size and consist of a nitrocellulose membrane or pellicle stretched over a rigid frame. The frames are often fabricated from metal, such as aluminum.

A light source is directed at the membrane and a known fraction of the optical amplitude is reflected while a majority of the optical amplitude is transmitted through the membrane. Pellicle beam splitters are useful in monitoring the amplitude of the light transmitted through the beam splitter. The known fraction of the optical amplitude that is reflected can be transmitted to a monitor photodiode where a determination can be made as to whether an adjustment to the optical amplitude is necessary.

As noted above, optical beam splitters are relatively large in size and cannot be used in smaller applications such as telecommunication modules and other applications that use semiconductor lasers as the light source. Accordingly, there is a need for a beam splitter that is as effective as a pellicle beam splitter in transmitting a majority of the optical amplitude while reflecting a known fraction of the amplitude for monitoring purposes and that further is small enough for the telecommunication modules and other laser applications.

There is an increasing demand for tunable lasers given the advent of wavelength-division multilplexing (WDM) which has become widespread in fiber optic communication systems. WDM transponders include a laser, a modulator, a receiver and associated electronics. One WDM transponder operates a fixed laser in the near-infrared spectrum at around 1550 nm. A 176 wavelength system uses one laser per wavelength and therefore such a system typically must store a 176 additional WDM transponders as spares to deal with failures. This high inventory requirement contributes to the high cost of these systems.

In response, tunable lasers have been developed. A single tunable laser can serve as a back-up for multiple channels or wavelengths so that fewer WDM transponders need to be stocked for spare part purposes. Tunable lasers can also provide flexibility at multiplexing locations, where wavelengths can be added and dropped from fibers as needed. Accordingly, tunable lasers can help carriers effectively manage wavelengths throughout a fiber optics network.

Figure 1:
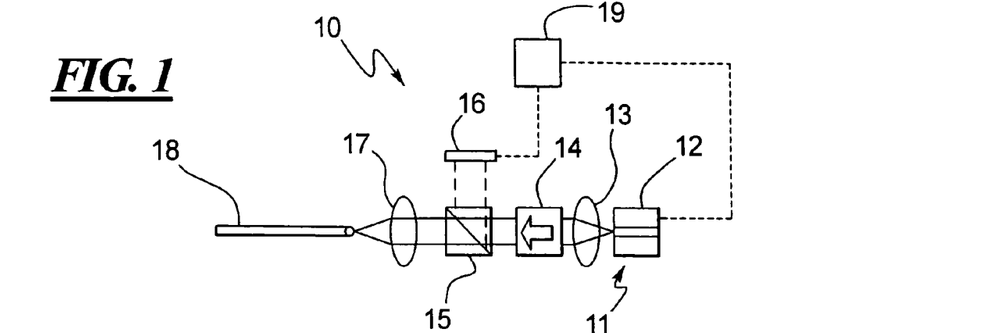
FIG. 1 is a schematic illustration of a tunable DFB or DBR laser module in accordance with the prior art.

Two currently available tunable lasers are distributed feedback (DFB) lasers and distributed brag reflector (DBR) lasers. A conventional tunable laser module 10 is illustrated in FIG. 1. In tunable lasers, the output power is most often measured from the front of the laser diode gain chip 12 of the laser 11, and not from a rear facet as is done with non-tunable lasers. The output of the laser diode gain chip 12 is directed through a collimating lens 13 and isolator 14. The optical output then engages the cubicle power tap 15 at an angle of about 45° where a fraction of the light is reflected toward a detector shown at 16 and the remaining output passes through the lens 17 to the fiber 18. The detector 16 and diode gain chip 12 are linked by various circuitry shown at 19 for tuning the laser or laser diode shown at 12.

A cube power tap 15 is typically a solid, coated optical element assembled into a standard beam splitter cube that reflects a small portion of the light and sends it to the detector 16 as discussed above. However, one difficulty with the standard beam splitter cube 15 is that it has many surfaces that can provide stray reflections. Although the amplitude of the stray reflections may be relatively small due to anti-reflection coatings applied to the surfaces of the cube 15, the presence of the reflected light can interfere with small signals that are typical of servo signal inputs used by the control mechanism 19 and diode gain chip 12 to adjust the wavelength of the laser 12.

As a result, there is a need for an improved power tap device which can eliminate the stray reflective rays.

BRIEF DESCRIPTION OF THE DRAWINGS

The disclosed apparatuses and methods are illustrated more or less diagrammatically in the accompanying drawing wherein.

DETAILED DESCRIPTION OF THE PRESENTLY PREFERRED EMBODIMENTS

Figure 2:
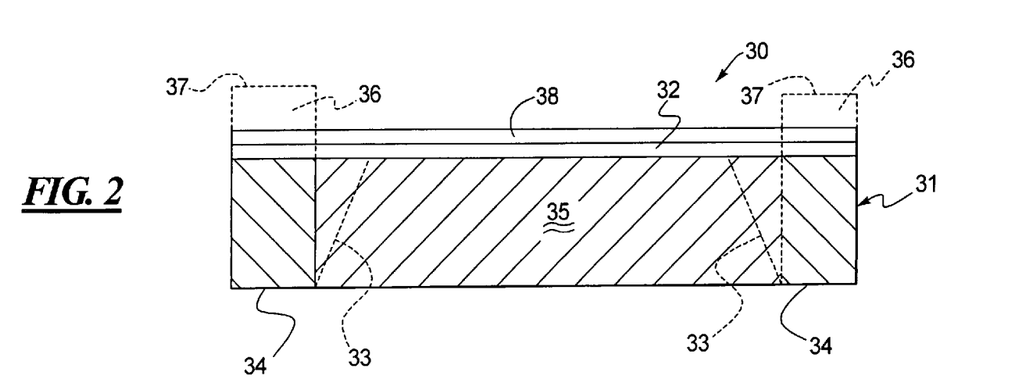
FIG. 2 is a sectional view of a micromachined pellicle beam splitter made in accordance with this disclosure.

A silicon micromachined pellicle beam splitter is disclosed. As shown in FIG. 2, a beam splitter 30 includes a silicon frame 31 that is coated with a silicon nitride membrane 32. The frame 31 is fabricated from a silicon substrate using dry or wet etch processes. For example, if a draft angle is desired as indicated by the tapered wall 33 shown in phantom in FIG. 2, a wet etch process may be required. If no draft angle is desired, then a dry etch process can be used.

The substrate 31 is coated with the silicon nitride layer 32. Then, a photoresist, metal or other protective layer (not shown) is coated onto the underside 34 of the substrate 31 leaving an uncoated area that eventually defines the etched volume shown at 35. An etch process is carried out to create the etch volume 35 without damaging the silicon nitride layer 32. If a wet etch process is utilized, potassium hydroxide is a suitable etchant.

It may also be desirable to include a protective support shown in phantom in FIG. 2 at 36. If this is the case, then the silicon nitride film 32 is sandwiched between the silicon substrate 31 that becomes the frame 31 and an additional silicon substrate 36. Again, another protective layer such as a photoresist or metallic layer is coated onto the top side 37 of the substrate 36 and the etching process is carried out through the substrate 31 and through the substrate 36 leaving the silicon nitride membrane 32 intact. If a draft angle is desired for the substrate or frame 31, a wet etch process may be carried out through the substrate 31 and if no draft angle is warranted for the protective frame 36, a dry etch process may be carried out for the substrate 36.

If a draft angle is desired for one substrate 31 but not the other substrate 36, or vice versa, then the wet and dry etchings are carried out separately. Otherwise, if the same etching technique is used for both substrates 31, 36, the etchings may be carried out concurrently.

Figure 3:
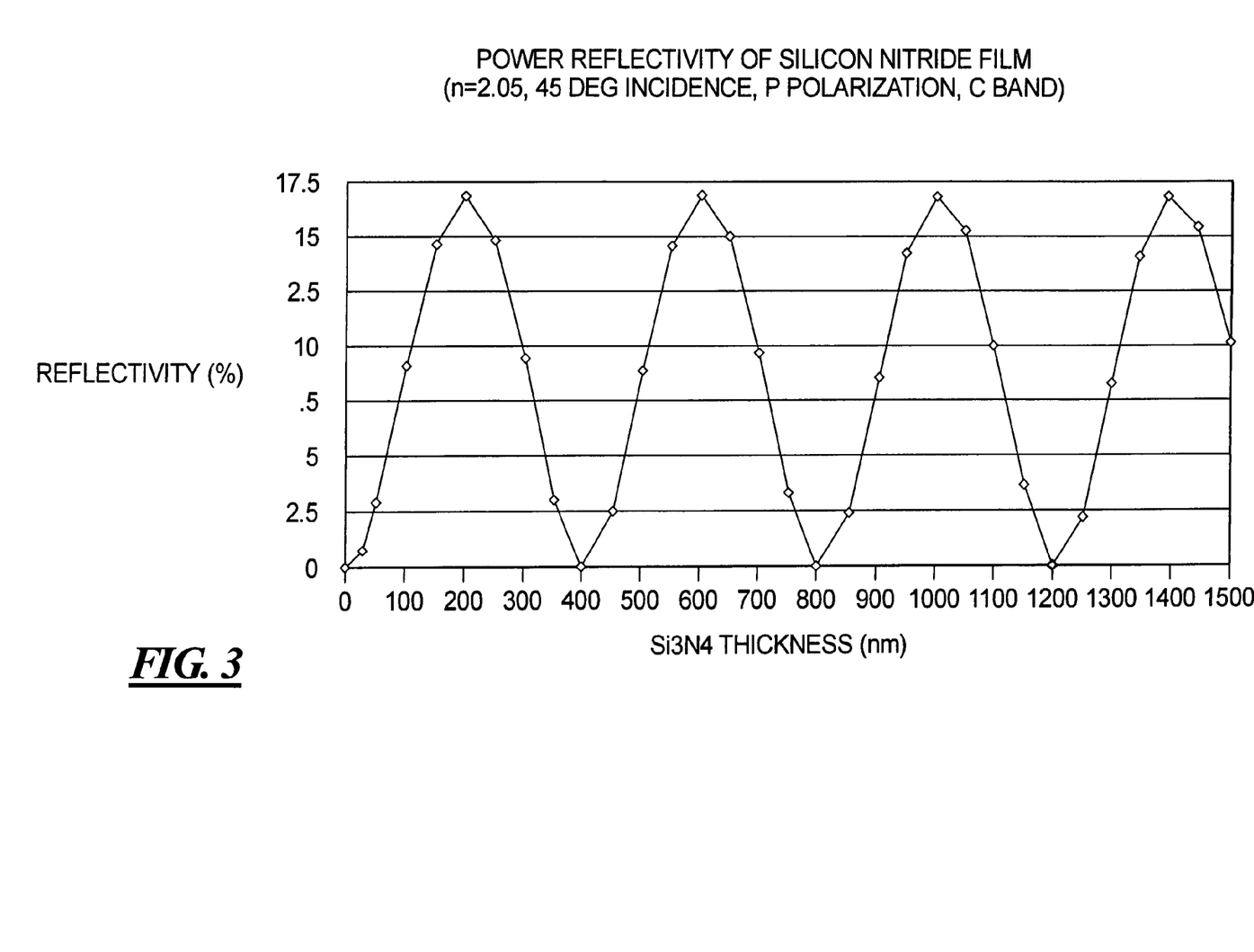
FIG. 3 illustrates, graphically, the reflectivity of a silicon nitride film versus film thickness for a P polarization, C band light wave directed at a silicon nitride film at a 45° angle of incidence.

For tunable laser applications, the thickness of the silicon nitride film or pellicle 32 should be on the order of about 20–60 nm because such a thickness results in a reflectivity of about 1% in the P polarization in the C band at a 45° angle of incidence as shown in FIG. 3. This approximately 1% reflectivity is a convenient level for power monitoring.

Further, thicknesses for the membrane 32 of approximately one-half of the optical wave for C band light can also be achieved. As shown in FIG. 3, in addition to low reflectivities for thin silicon nitride films with thickness less than 60 nm, low reflectivities are also exhibited for silicon nitride films having thicknesses of about one-half of the optical wave for C band light. Films of these thicknesses may also provide low reflectivity at the design wavelength. It may be convenient for a power monitoring application that the calibration curve never encounters a zero in reflectivity. Thus, it may be desirable for the thickness of the membrane 32 of the pellicle beam splitter 30 to be more or less than one half of a wavelength thickness optically.

Figure 4:
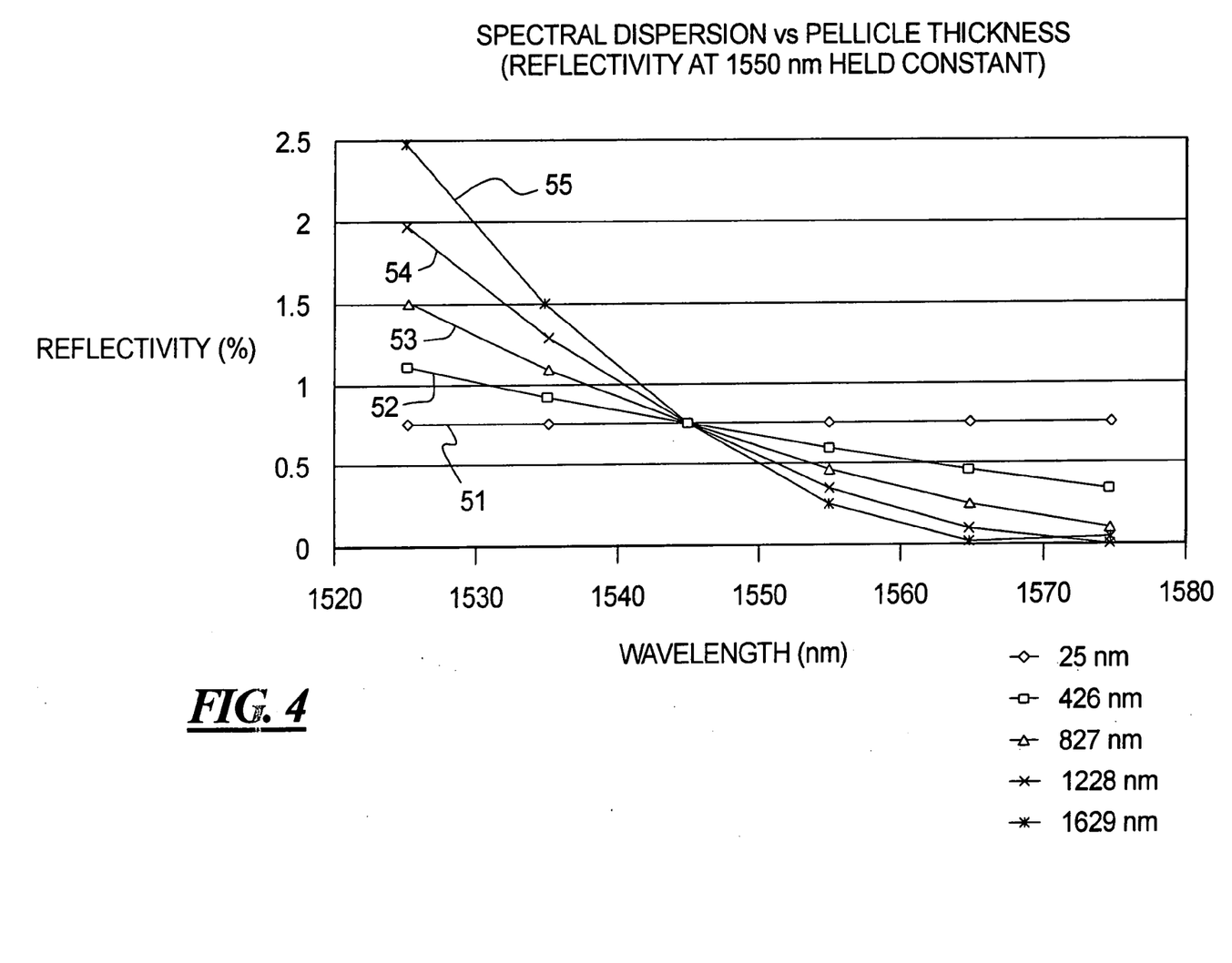
FIG. 4 illustrates, graphically, the spectral performance of five pellicle membranes set in P polarization at a 45° angle of incidence wherein the membranes have thicknesses of about 25 nm, 426 nm, 827 nm, 1228 nm and 1529 nm.

FIG. 4 illustrates, graphically, the reflectivity that results from various selected silicon nitride film thicknesses, 25, 426, 827, 1228 and 1629 nm, as a function of wavelength. It will be noted that the reflectivity at a 1550 mm wavelength using a thin, 25 nm film thickness remains relatively constant. Therefore, thin silicon nitride films (20–40 nm) may prove to be more convenient for the wavelength range shown in FIG. 4 because of the constant reflectivity or relatively flat slopes of the reflectivity curves.

Further, more complex film stacks may be utilized depending upon the spectral property desired. Thus, FIG. 2 also shows an optional layer 38 may be used to protect the silicon nitride layer 32 or vary the spectral property of the beam splitter 30. One suitable material for the additional layer 38 is silicon dioxide. However, other materials will be apparent to those skilled in the art who desire to vary the spectral properties of the beam splitter 30. Film stacks of three or more films are contemplated and may be desirable for a variety of applications.

The combination of silicon for the substrate or frame 31 and silicon nitride for the membrane 32 is advantageous because silicon has a coefficient of thermal expansion on the order of about 2.6 while silicon nitride has a coefficient of thermal expansion on the order of about 4. As a result, the silicon nitride membrane 42 will remain in a state of tension which results in the low reflectivity of the beam splitter 30. Because silicon dioxide has a CTE of about 0.5, it would not a suitable material for the membrane layer 38 when silicon is used for the frame 31. Materials other than silicon nitride could be used for the membrane layer 32, however, the coefficient of thermal expansion of the membrane layer 32 should be greater than that of the material used for the substrate or frame 31.

The draft angle provided by the wall shown in phantom at 33 in FIG. 2 is useful if an angle of incidence of about 45° is utilized. The draft angle provided by the wall 33 reduces the amount of clipping caused by the frame 31.

Another advantage to the beam splitter 30 is the very small beam displacement upon transmission. Specifically, the amount of the beam displacement is less than the thickness of the membrane layer 32 and, as a result, the use of very small beams with the beam splitter 30 is possible and therefore the beam splitter 30 will be useful in telecom modules and other devices requiring the use of very small beams.

While an approximately 30 nm thickness has been suggested for the membrane layer 32, particularly if silicon nitride is chosen as the material for the membrane 32, the 30 nm thickness is suggested for small beam applications, such as telecom modules. The thickness of the membrane 32 can vary greatly, depending upon the particular application. The use of a thin film, however, permits a wide range of convergence with minimal affect on interference properties. Further, thin films are typically very parallel, which avoids substantial angular displacement of the beam upon transmission through the beam splitter 30.

Figure 5:
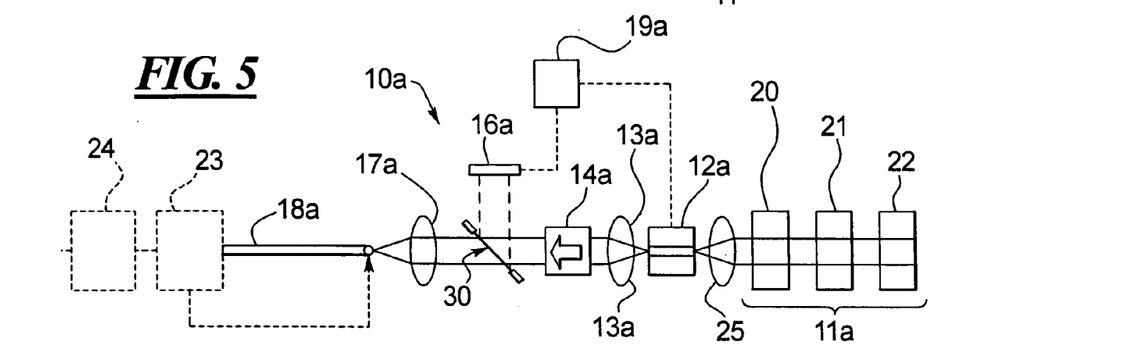
FIG. 5 is a schematic illustration of a tunable laser module incorporating a disclosed micromachined pellicle beam splitter as shown in FIG. 1.

FIG. 5 illustrates a tunable laser module 10a equipped with a pellicle beam splitter 30 as disclosed in FIG. 2. The components of the module 10a that are the same as those shown in FIG. 1 will be referenced with like reference numerals with the suffix "a". For the reasons set forth above, the beam splitter 30 is superior to the cube 15 (FIG. 1) because of its ability to eliminate stray reflections.

Specifically, the components of the laser 11a include a back cavity mirror 22 with a reflective coating. Between the diode gain chip 12a and the back cavity mirror 22 are one or more thermally tuned filters shown at 20, 21 and a diode intracavity collimating lens 25 or laser cavity lens 25. Light reflected off of the back cavity mirror 22 passes through the filters 20, 21 and through the lens before passing through the diode gain chip 12a where it again passes through a diode output collimating lens 13a before passing through the isolator 14a to the pellicle beam splitter 30. A small fraction of light is reflected off of the pellicle beam splitter 30, which as shown in FIG. 5 is preferably disposed at an angle of about 45° to the light path. The small fraction of light is detected at the detector 16a and a signal is transmitted to the adjustment circuitries shown at 19a for tuning the laser diode gain chip 12a. The majority of the light passes through the pellicle beam splitter 30 and through the fiber focusing lens 17a to the polarization preserving fiber 18a.

FIGS. 4 and 6–9 illustrate various methodologies for designing the micromachined pellicle beam splitter 30 for use in a tunable laser module 10a.

Figure 6:
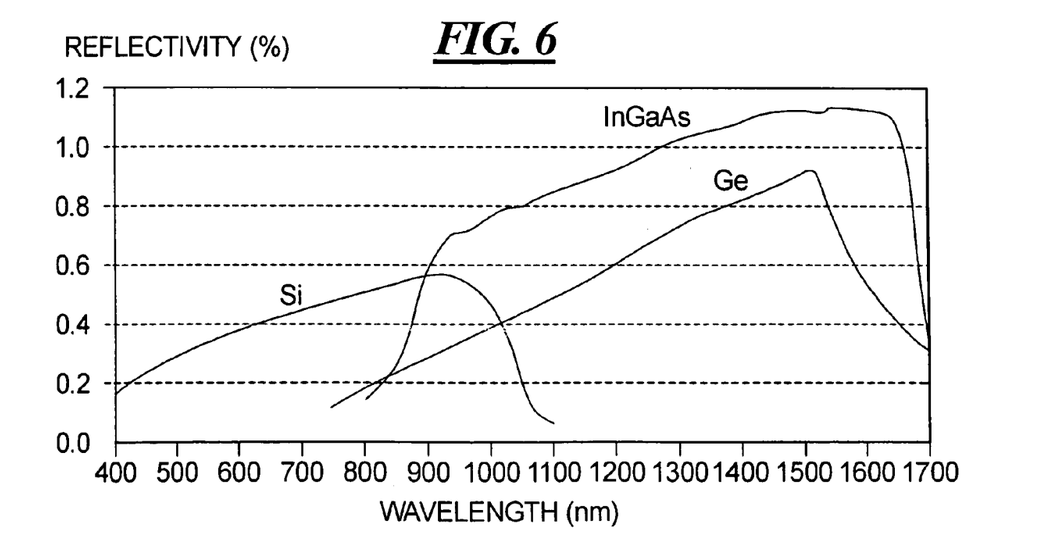
FIG. 6 illustrates, graphically, detector sensitivities or responsivities versus wavelength for InGaAs, Ge and Si detectors that can be used to design an appropriate micromachined pellicle beam splitter for a tunable laser module incorporating one of said detectors.

Referring to FIG. 6, it is well known that the responsivities of the detector shown at 15a will vary depending upon the wavelength detected and therefore the tuning range of the module 10a. Variances in detector sensitivity can decrease the effective resolution of the detector circuitry (16a, 19a and 12a) and may require the use of extensive look-up tables for power calibration.

As shown in FIG. 6, silicon detectors in the visible, germanium in the S-band, C-band and L-band and indium/gallium/arsenic detectors in the L-band all exhibit variations and detectors sensitivity across relatively wide tuning ranges. Design of the pellicle beam splitter 30 incorporated into a tunable laser module such as that shown at 10a in FIG. 5 can compensate for at least some variations in detector sensitivity as illustrated in FIGS. 7–10.

Figure 7:
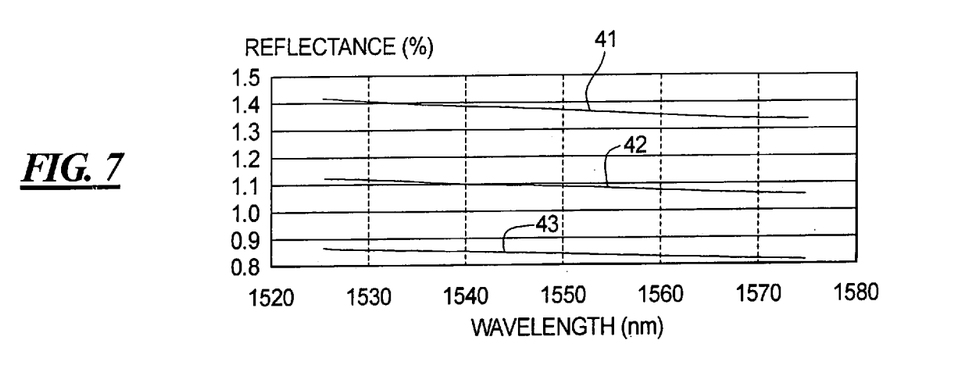
FIG. 7 illustrates, graphically, the spectral performance of a silicon nitride pellicle film set in P polarization at a 45° angle, at near zero wave solution, for three membranes, all at about a half wavelength thickness for near zero wave solution, i.e., about 34, 30 and 26 nm or about 30 nm and +/−12%.

Turning to FIG. 7, the spectral performance of three pellicle membranes of a disclosed beam splitter 30 is shown where the line 41 represents a silicon nitride film having a thickness of 34 nm, the line 42 represents a silicon nitride film having a thickness of about 30 nm and the line 43 represents silicon nitride film having a thickness of about 26 nm. These three films represent thicknesses approaching a near zero wave solution as shown in the graph of FIG. 3. The film represented by the line 41 is approximately 12% thicker than the film represented by the line 42 and the film represented by the line 43 is about 12% thinner than the film represented by the line 42. The response of these silicon nitride films is nearly flat over the wavelength range of interest. Hence, choosing these thicknesses will provide little or no compensation for the germanium or indium/gallium/arsenic detectors illustrated in FIG. 6. However, for the flat portion of the indium/gallium/arsenic curve (1500 to 1600 nm), the thin silicon nitride membranes would be suitable. These membranes would not provide a compensating effect for a germanium detector over the same wavelength and thus, a different compensation scheme, if desired, would need to be investigated as shown below.

Figure 8:
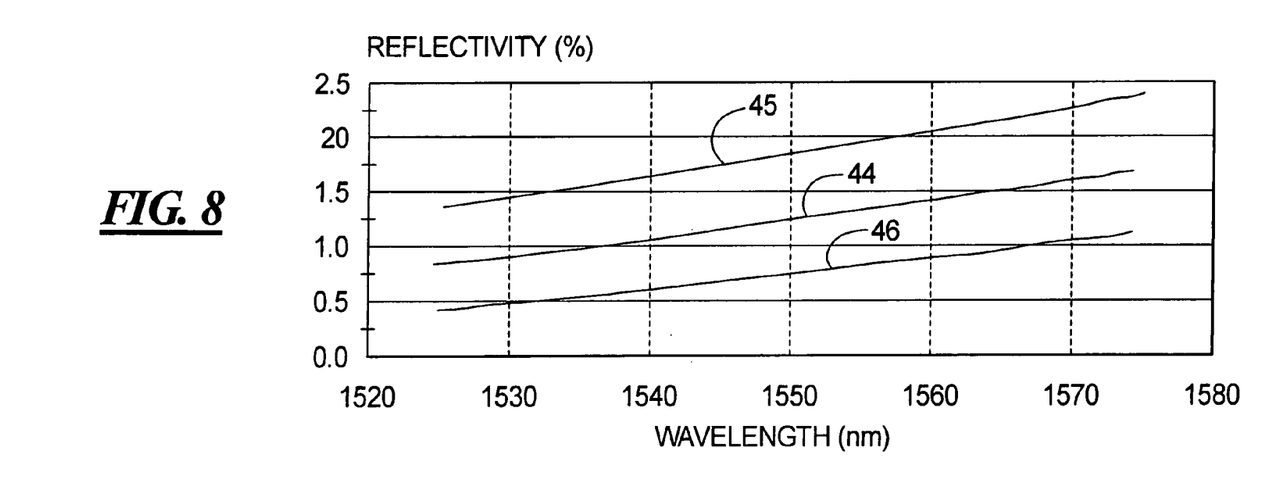
FIG. 8 illustrates, graphically, the spectral performance of three pellicle membranes set in P polarization at a 45° angle wherein one membrane has a thickness less than a half wavelength for the C band (~370 nm) and the two other films shown are about 2% thicker and about 2% thinner than the initial films, i.e., about 362 and 378 nm.

Turning to FIG. 8, the spectral performance of a pellicle membrane 32 of a beam splitter 30 set in P polarization at a 45° angle is presented. The line 44 represents a silicon nitride film having a thickness of about 370 nm, the line 45 represents a silicon nitride film having a thickness of about 362 nm and the line 46 represents silicon nitride film having a thickness of about 378 nm. As can been seen in FIG. 8, the reflectivity increases as wavelength increases for these three films which would be useful in compensating for the drop in responsivity of a germanium detector at wavelengths exceeding 1500 nm or in the C-band. In other words, using the disclosed pellicle beam splitters, with an appropriate silicon nitride thickness, can greatly assist in flattening out the responsivity curve for a germanium detector and the C-band (see FIG. 6). Thus, referring to FIGS. 8 and 3 together, films having wavelengths approaching the half-way thicknesses shown in FIG. 3 (i.e., 300 to 390 nm, 700 to 790 nm or 1100 to 1190 nm) would prove useful in flattening out the responsivity curve for a germanium detector in the C-band.

Figure 9:
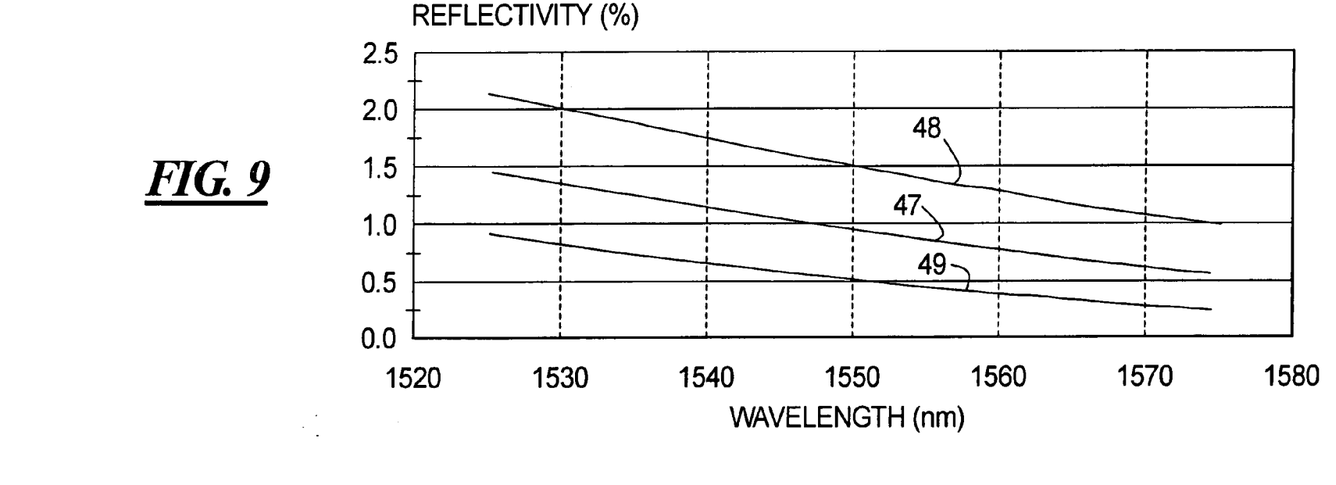
FIG. 9 illustrates, graphically, the spectral performance of three pellicle membranes set in P polarization at a 45° angle wherein the first membrane has a thickness greater than a half wave for the C band (~430 nm) and the other two membranes have thicknesses that are about 2% greater and 2% thinner than the first membrane, i.e., about 438 and 422 nm.

Turning to FIG. 9, the spectral performance of a pellicle beam splitter 30 with a silicon nitride membrane 32 is illustrated in P polarization at a 45° angle of incidence wherein the thicknesses of the silicon nitride membrane 32 are longer than a C-band wavelength. Specifically, the line 47 represents a membrane 32 with a thickness of about 430 nm, the line 48 represents a silicon nitride membrane with a thickness of about 438 nm and the line 49 represents a silicon nitride membrane 32 with a thickness of about 422 nm. Thus, the membranes represented by the lines 48 and 49 are slightly thicker and thinner (+/−2%) than the membrane represented by the line 47. As can be seen in FIG. 9, the reflectivity decreases as the wavelength increases. These membranes could be useful for an indium/gallium arsenic detector in the C-band or the S-band range to compensate for the downward slope of the responsivity curve for an indium/gallium/arsenic detector as the wavelength increases (see FIG. 6). Referring to FIGS. 3 and 9, membranes having thicknesses greater than the half-way thickness for the C-band as shown in FIG. 3, i.e., 10 to 80 nm, 410 to 480 nm, 810 to 880 nm, 1210 to 1280 nm or 1610 to 1680 nm would prove useful for flattening out the downward slope of the responsivity curve for an indium/gallium/arsenic detector as shown in FIG. 6.

Similarly, returning to FIG. 4, the spectral performance of 5 silicon nitride membranes 32 set in P polarization at a 45° angle of incidence is presented wherein the line 51 represents a membrane having a thickness of about 25 nm, the line 52 represents a membrane having a thickness of about 426 nm, the line 53 represents a membrane having a thickness of about 827 nm, the line 54 represents a membrane having a thickness of about 1228 nm and the line 55 represents a membrane having a thickness of about 1629 nm. The downward slope of these lines as wavelength increases could be used to compensate for the upward slope of the responsivity curve of an indium/gallium/arsenic detector in the C-band range or the S-band range (see FIG. 6). Referring to FIGS. 9 and 3, membranes having thicknesses at or close to the half-wave wavelengths shown in FIG. 3, i.e., 10 to 50 nm, 410 to 450 nm, 810 to 850 nm, 1210 to 1250 nm and 1610 to 1650 nm would be useful in compensating for the upward slope of the responsivity curve of an indium/gallium/arsenic detector in the C-band range r the S-band range as shown in FIG. 6.

Thus, an improved tunable laser module 10a is disclosed whereby a pellicle beam splitter 30 as disclosed herein, with an appropriately selected silicon nitride membrane 32 thickness that can compensate for variances in responsivity of the detector 16a over the tunable wavelength range.

Specifically, referring to FIG. 5, light is generated by the laser 11a and reflected off of the back cavity mirror 22, through one or more filters shown at 20, 21 and through the diode intracavity collimating lens 25 to the diode gain chip 12a. Light emerges from the diode gain chip (or other suitable gain media) 12a and passes through another collimating lens 13a before passing through an isolator 14a. Light emerging from the isolator 14a engages the pellicle beam splitter 30 where a fraction is reflected to the detector 16a and an adjustment to the diode gain chip 12a output is made either directly or by way of a control circuitry 19a. Thus, light passing through the beam splitter 30 and through the fiber focusing lens 17a to the polarization preserving fiber 18a is constantly monitored by way of the beam splitter 30 and detector 16a and tuned or adjusted by way of the circuitry 19a and diode gain chip 12a are other suitable gain media. Various other control loops will be apparent to those skilled in the art. Thus, the wavelength of the output from the laser 11a can be adjusted by modifications to the one or more thermally tuned filters shown at 20, 21.

In the foregoing detailed description, the disclosed structures and manufacturing methods have been described with reference exemplary embodiments. It will, however, be evident that various modifications and changes may be made thereto without departing from the broader spirit and scope of this disclosure. The above specification and figures accordingly are to be regarded as illustrated rather than restrictive. Particular materials selected herein can be easily substituted for other materials that will be apparent to those skilled in the art and would nevertheless remain equivalent embodiments of the disclosed devices and manufacturing methods.

What is claimed is:

1. A tunable laser module comprising:
    a laser comprising a gain media directed at a pellicle beam splitter,
    the beam splitter comprising a frame comprising an opening extending there through, the frame comprising a first material having a first coefficient of thermal expansion (CTE),
    a membrane comprising a film attached to the frame and covering the opening, the membrane comprising a second material having a second CTE,
    the first CTE being less than the second CTE,
    the beam splitter being axially aligned with and disposed between an optical fiber and the gain media, the pellicle beam splitter being disposed at an angle with respect to the gain media with the membrane being directed at a detector,
    the detector, the gain media and the laser being linked by a control circuitry, and
    a protective frame with an opening in matching registry with the opening of the frame and being disposed over the membrane to sandwich the membrane between the protective frame and the frame.

2. The module of claim 1 wherein the detector is a InGaAs detector, the membrane is a silicon nitride membrane with a thickness selected from the group consisting of the following ranges: 10 to 80 nm, 410 to 480 nm, 810 to 880 nm, 1210 to 1280 nm and 1610 to 1680 nm.

3. The module of claim 1 wherein the detector is a Ge detector and the membrane is a silicon nitride membrane with a thickness selected from the group consisting of the following ranges: 300 to 390 nm, 700 to 790 nm, 1100 to 1190 nm, and 1500 to 1590 nm.

4. The module of claim 1 wherein the first material is silicon, the second material is silicon nitride and the protective frame is fabricated from silicon.

5. The module of claim 1 wherein the first material is silicon and the second material is silicon nitride.

6. The module of claim 1 wherein the membrane is in a state of tension.

7. The module of claim 1 wherein the frame comprises a first side and a second side, the opening extending from the first side to the second side, the membrane being attached to the second side, the opening being wider at the first side of the frame and narrower at the second side of the frame to provide a draft angle.

8. The module of claim 1 wherein the first material is in a crystallized state and the opening is produced by a wet etch process.

9. The module of claim 1 further comprising a second thin film disposed over the membrane and sandwiching the membrane between the frame and the second film.

10. The module of claim 1 further comprising a plurality of films stacked on top of the membrane.

11. An array of optical transponders, each transponder comprising:
    a tunable laser module comprising
        a laser comprising a diode gain chip,
        the diode gain chip being directed at a pellicle beam splitter,
        the beam splitter comprising a frame comprising an opening extending there through, the frame comprising a first material having a first coefficient of thermal expansion (CTE), a membrane comprising a film attached to the frame and covering the opening, the membrane comprising a second material having a second CTE, the first CTE being less than the second CTE,
        the beam splitter being axially aligned with an optical fiber and disposed between the fiber and the diode gain chip, the pellicle beam splitter being disposed at about a 45° angle with respect to the optical fiber and diode gain chip with the membrane being directed at a detector so that light passing through the diode gain chip engages the membrane of the beam splitter where it is partially reflected to the detector with most of the light passing through the beam splitter to the fiber,
        the detector, the diode gain chip and the laser being linked by a control circuitry,
        the fiber being coupled to a modulator, and
    wherein each transponder generates an output received by its respective modulator having a wavelength that is different than the other transponders of the array.

12. The transponder of claim 11 wherein the detector is a InGaAs detector, the membrane is a silicon nitride membrane with a thickness selected from the group consisting of the following ranges: 10 to 80 nm, 410 to 480 nm, 810 to 880 nm, 1210 to 1280 nm and 1610 to 1680 nm.

13. The array of transponder of claim 11 wherein each detector is a Ge detector and each membrane is a silicon nitride membrane with a thickness selected from the group consisting of the following ranges: 300 to 390 nm, 700 to 790 nm, 1100 to 1190 nm, and 1500 to 1590 nm.

14. The transponder of claim 11 wherein each modulator is coupled to a receiver.

15. The array of transponder of claim 11 wherein each beam splitter further comprises a protective frame with an opening in matching registry with the opening of the frame and being disposed over the membrane to sandwich the membrane between the protective frame and the frame.

16. The array of transponder of claim 15 wherein the first material is silicon, the second material is silicon nitride and the protective frame is fabricated from silicon.

17. The array of transponder of claim 11 wherein the first material is silicon and the second material is silicon nitride.

18. The array of transponder of claim 11 wherein the membrane is in a state of tension.

19. The array of transponders of claim 11 wherein each frame comprises a first side and a second side, the opening of each extending from the first side to the second side, each membrane being attached to the second side of its respective frame, the opening being wider at the first side of each frame and narrower at the second side of each frame to provide a draft angle.

20. The array of transponder of claim 11 wherein the first material is in a crystallized state and the opening is produced by a wet etch process.

21. The array of transponder of claim 11 further comprising a second thin film disposed over each membrane and sandwiching the membrane between the frame and the second film.

22. The array of transponder of claim 11 further comprising a plurality of films stacked on top of the membrane.

23. A method for tuning a laser comprising:
directing light from a laser gain media through a pellicle beam splitter which is aligned with an optical fiber, the beam splitter comprising a frame comprising an opening extending there through, the frame comprising a first material having a first coefficient of thermal expansion (CTE), a membrane comprising a film attached to the frame and covering the opening, the membrane comprising a second material having a second CTE, the first CTE being less than the second CTE, a protective frame with an opening in matching registry with the opening of the frame and being disposed over the membrane to sandwich the membrane between the protective frame and the frame,
reflecting a minor portion of light from the membrane to a detector and transmitting a major portion of the light through the membrane to the optical fiber,
detecting a wavelength for the minor portion of the reflected light received at the detector and comparing the detected wavelength with a desired wavelength,
decreasing the wavelength of light emitted by the laser if the detected wavelength is greater than the desired wavelength by more than a predetermined margin,
increasing the wavelength of light emitted by the laser if the detected wavelength is less than the desired wavelength by more than a predetermined margin.

24. The method of claim 23 wherein the detector is a InGaAs detector, the membrane is a silicon nitride membrane with a thickness selected from the group consisting of the following ranges: 10 to 80 nm, 410 to 480 nm, 810 to 880 nm, 1210 to 1280 nm and 1610 to 1680 nm.

25. The method of claim 23 wherein the detector is a Ge detector and the membrane is a silicon nitride membrane with a thickness selected from the group consisting of the following ranges: 300 to 390 nm, 700 to 790 nm, 1100 to 1190 nm, and 1500 to 1590 nm.

26. The method of claim 23 wherein the first material is silicon, the second material is silicon nitride and the protective frame is fabricated from silicon.

27. A tunable laser module comprising:
a laser comprising a gain media directed at a pellicle beam splitter,
the beam splitter comprising a frame comprising an opening extending there through, the frame comprising a first material having a first coefficient of thermal expansion (CTE),
a membrane comprising a solid film free of holes or perforations, the film attached to the frame and covering the opening, the membrane comprising a second material having a second CTE,
the beam splitter being axially aligned with and disposed between an optical fiber and the gain media, the pellicle beam splitter being disposed at an angle with respect to the gain media with the membrane being directed at a detector,
the detector, the gain media and the laser being linked by a control circuitry, a protective frame with an opening in matching registry with the opening of the frame and being disposed over the membrane to sandwich the membrane between the protective frame and the frame.

28. The tunable laser module of claim 27 wherein the first CTE is less than the second CTE.

29. A tunable laser module comprising:
a laser comprising a gain media directed at a pellicle beam splitter,
the beam splitter comprising a frame comprising an opening extending there through, the frame comprising a first material, a membrane comprising a film attached to the frame and covering the opening, the membrane comprising a second material,
the beam splitter being axially aligned with and disposed between an optical fiber and the gain media, the pellicle beam splitter being disposed at an angle with respect to the gain media with the membrane being directed at a detector,
the detector, the gain media and the laser being linked by a control circuitry, and
a protective frame with an opening in matching registry with the opening of the frame and being disposed over the membrane to sandwich the membrane between the protective frame and the frame.

* * * * *

UNITED STATES PATENT AND TRADEMARK OFFICE
CERTIFICATE OF CORRECTION

PATENT NO. : 6,972,907 B2
APPLICATION NO. : 10/980057
DATED : December 6, 2005
INVENTOR(S) : William J. Kozlovsky et al.

It is certified that error appears in the above-identified patent and that said Letters Patent is hereby corrected as shown below:

Delete Drawing sheet fig 3, and substitute Drawing Sheet fig 3 on the attached page.

Signed and Sealed this

Twenty-fourth Day of October, 2006

JON W. DUDAS
*Director of the United States Patent and Trademark Office*

FIG. 3